(12) United States Patent
Murphy et al.

(10) Patent No.: US 7,150,186 B2
(45) Date of Patent: Dec. 19, 2006

(54) DOOR INTERLOCK APPARATUS AND METHOD FOR ALTERNATOR/STARTER BENCH TESTING DEVICE

(75) Inventors: Jason Murphy, Austin, MN (US); Scott Krampitz, Blooming Prairie, MN (US); Kurt Raichle, Owatonna, MN (US)

(73) Assignee: SPX Corporation, Charlotte, NC (US)

( * ) Notice: Subject to any disclaimer, the term of this patent is extended or adjusted under 35 U.S.C. 154(b) by 81 days.

(21) Appl. No.: 10/975,338

(22) Filed: Oct. 29, 2004

(65) Prior Publication Data

US 2006/0090551 A1 May 4, 2006

(51) Int. Cl.
*G01M 15/00* (2006.01)
(52) U.S. Cl. .................... 73/119 R; 73/118.1
(58) Field of Classification Search ............... 73/116, 73/117.2, 117.3, 118.1, 119 R
See application file for complete search history.

(56) References Cited

U.S. PATENT DOCUMENTS

| | | | | |
|---|---|---|---|---|
| 3,745,456 A | * | 7/1973 | Kahler | 324/378 |
| 3,903,737 A | * | 9/1975 | Burden et al. | 73/118.1 |
| 3,936,744 A | | 2/1976 | Perlmutter | 324/158 |
| 4,070,624 A | | 1/1978 | Taylor | 324/158 |
| 4,500,304 A | | 2/1985 | Foster | 474/138 |
| 4,666,122 A | | 5/1987 | Goodard | 248/666 |
| 4,781,665 A | | 11/1988 | Walker | 474/133 |
| 4,832,666 A | | 5/1989 | Henderson | 474/135 |
| 4,849,665 A | | 7/1989 | Kitamura et al. | 310/68 |
| 4,945,272 A | | 7/1990 | Ochi et al. | 310/91 |
| 4,980,589 A | | 12/1990 | Ochi et al. | 310/68 |
| 5,040,493 A | | 8/1991 | Gajewski et al. | 123/41.31 |
| 5,125,376 A | | 6/1992 | Williams et al. | 123/195 |
| 5,156,573 A | | 10/1992 | Bytzek et al. | 474/74 |
| 5,195,366 A | * | 3/1993 | Duncan | 73/118.1 |
| 5,473,208 A | | 12/1995 | Stihi | 310/68 |
| 5,541,840 A | | 7/1996 | Gurne et al. | 364/424.03 |
| 5,550,485 A | * | 8/1996 | Falk | 324/772 |
| 5,689,517 A | | 11/1997 | Ruparel | 371/22.3 |
| 5,705,870 A | | 1/1998 | Thomsen et al. | 310/91 |
| 5,718,196 A | | 2/1998 | Uchiyama et al. | 123/195 |
| 5,938,169 A | | 8/1999 | Ogawa et al. | 248/674 |
| 6,009,363 A | | 12/1999 | Beckert et al. | 701/33 |
| 6,026,461 A | | 2/2000 | Baxter et al. | 710/244 |
| 6,147,426 A | | 11/2000 | Lepi et al. | 310/91 |
| 6,175,789 B1 | | 1/2001 | Beckert et al. | 701/33 |
| 6,181,992 B1 | | 1/2001 | Gurne et al. | 701/29 |
| 6,226,305 B1 | | 5/2001 | McLoughlin et al. | 370/532 |
| 6,276,194 B1 | * | 8/2001 | Vinton et al. | 73/40.7 |
| 6,292,931 B1 | | 9/2001 | Dupenloup | 716/18 |
| 6,304,012 B1 | | 10/2001 | Chen et al. | 310/58 |
| 6,304,016 B1 | | 10/2001 | Frederick et al. | 310/91 |
| 6,394,250 B1 | | 5/2002 | Ouchi | 192/45 |
| 6,480,723 B1 | | 11/2002 | Davidson et al. | 455/557 |
| 6,553,039 B1 | | 4/2003 | Huber et al. | 370/466 |
| 6,634,896 B1 | | 10/2003 | Potega | 439/218 |
| 6,647,027 B1 | | 11/2003 | Gasparik et al. | 370/519 |

(Continued)

*Primary Examiner*—Eric S. McCall
(74) *Attorney, Agent, or Firm*—Baker & Hostetler LLP

(57) ABSTRACT

An apparatus and method for testing vehicle motor rotary accessory devices has a base and a housing assembly connected to the base. A mounting component is attached to the base. The apparatus includes a door cover which is rotatably attached to a side of the housing assembly and the mounting component. A switch assembly is mounted to the mounting component and positioned to contact a portion of the door cover when the door cover is rotated to a prescribed position.

15 Claims, 5 Drawing Sheets

U.S. PATENT DOCUMENTS

| | | | |
|---|---|---|---|
| 6,674,046 B1 | 1/2004 | Bankstahl et al. | 219/133 |
| 6,687,263 B1 | 2/2004 | van Oldenborgh et al. | 370/476 |
| 6,704,829 B1 | 3/2004 | Hoshi et al. | 710/305 |
| 6,738,696 B1 | 5/2004 | Oi | 701/29 |
| 6,834,631 B1 | 12/2004 | Blackburn et al. | 123/179.3 |
| 6,895,809 B1 * | 5/2005 | Raichle | 73/119 R |
| 6,986,292 B1 * | 1/2006 | Kemnade | 73/862.191 |
| 2004/0108855 A1 * | 6/2004 | Raichle | 324/378 |
| 2004/0118194 A1 * | 6/2004 | Raichle | 73/118.1 |
| 2004/0163501 A1 | 8/2004 | Chen | 81/177.1 |

* cited by examiner

DOOR INTERLOCK APPARATUS AND METHOD FOR ALTERNATOR/STARTER BENCH TESTING DEVICE

FIELD OF THE INVENTION

The present invention pertains to testing equipment for vehicle motor rotary accessory devices, such as for example, alternators and/or starter motors. More particularly, the invention relates to providing an integrated door and interlock assembly on a bench testing device and further provides a fail-safe method for shutting down a testing device as a safety precaution for testing vehicle motor rotary accessory devices.

BACKGROUND OF THE INVENTION

It is well known in the vehicle industry that certain rotary accessory devices are often used in connection with vehicle motors. Two such well known accessory devices are alternators and starter motors. Alternators are used in connection with an engine, typically by being driven by a belt that is driven by the engine. Alternators have internal components which when rotated supply electrical power which may be used in the vehicle and/or engine. Alternators are typically removably but rigidly mounted via a bracket to the engine block or the chassis of the vehicle. In many cases, where a standard type of alternating mounting arrangement is used, the alternator has "ears" with holes that are mounted onto a post or belt attached to the vehicle permitting pivoting of the alternator so that the alternator can be pivoted around the post against the belt tension in order to install and remove belts, and provide a suitable tension when the belt is installed.

Starter motors are electrical motors which are typically removably but rigidly mounted to an engine or transmission casing and which have an electrically driven pinion gear extending from the starter motor that engages a component, typically gears on the flywheel of the engine, in order to be able to rotate the crank shaft of the engine to start it. There are a wide range of attachment mechanisms for attaching such a starter motor.

It is often desirable to test alternators and/or starter motors at locations where they have been removed from the vehicle, e.g., on a test bench. For example, such testing may be desirable before installing a new alternator or starter or may be desirable for removing an existing alternator or starter for testing when diagnosing vehicle problems.

Existing designs for alternator and/or starter testers may include an capability to attach a belt to the pulley of an alternator and drive the alternator belt with a motor. For testing starter motors, the starter motor may typically be connected to a device that provides power to the starter motor so the motor is selectively operated. Assembled in the prescribed manner, the alternator or starter can be subjected to significant currents and/or produce powerful voltages in an effort to test the components. Furthermore, alternators and starters contain movable parts when energized, for instance, during a bench test. Hence, difficulty may result from avoiding components which could become dislodged during a bench test procedure.

While operators of alternator and/or starter tester equipment are typically trained to operate such equipment, such machinery may include rudimentary guards and warning decals that can be routinely defeated or even ignored. Thus, it would be desirable to have an apparatus and method that is able to conveniently guard against exposure to significant currents and/or voltages during a bench test procedure. It would be further desirable to have an apparatus and method that is able to conveniently guard against flying debris and/or exposure to moving parts during a bench test procedure.

SUMMARY OF INVENTION

In one aspect, an embodiment of the invention provides an apparatus for testing a vehicle motor rotary accessory devices, comprising a base and a housing wherein the housing is connected to the base. Additionally, a first component may be located and connected to the base. The apparatus also provides a door cover located and rotatably mounted between a side surface of the housing and the first component. A switch assembly is mounted to the first component and positioned to contact a portion of the door cover when the door cover is rotated to a first position.

In another aspect, an embodiment for the invention provides a method of implementing a safety mechanism in a testing device for vehicle motor rotary accessory devices comprising providing a base component and a housing component connected to the base component. The method also provides locating and connecting a first component to the base component and locating a door cover between a side surface of the housing and the first component. The door cover is rotatably attached to the side surface and the first component. A switch assembly is mounted to the first component and positioned to contact a portion of the door cover when the door cover is rotated to a first position.

In another aspect, an embodiment for the invention provides a system for implementing a safety mechanism in a testing means for vehicle motor rotary accessory devices comprising providing a base component and a housing component connected to the base component. The system also provides a means for mounting located and connected to the base component, a means for protecting located between a side surface of the housing and the mounting means, and rotatably attaching the protecting means to the side surface and the mounting means. A means for closing an electrical circuit is mounted to the mounting means and positioned to contact a portion of protecting means when the protecting means is rotated to a first position.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
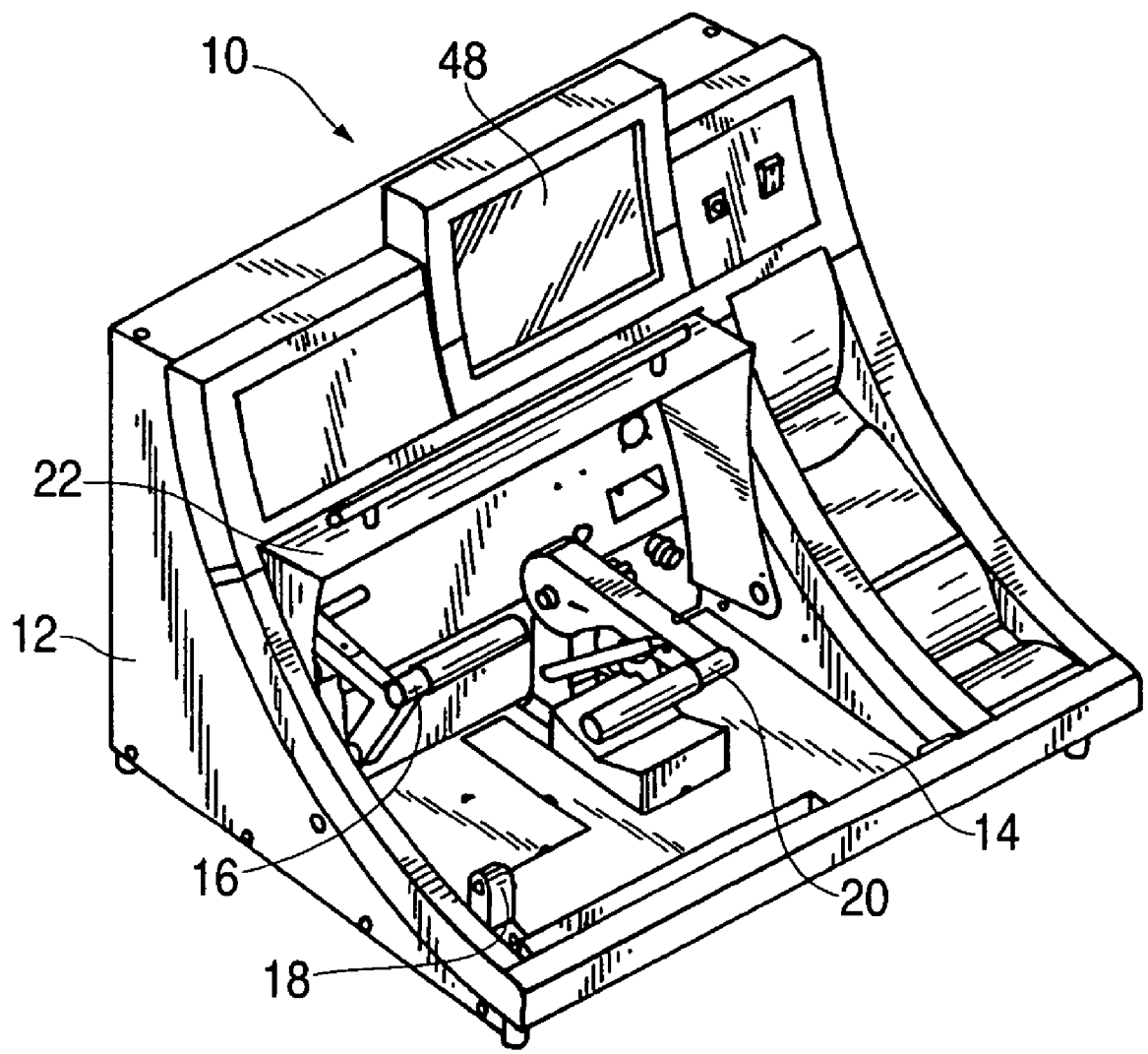
FIG. 1 is a perspective view of a alternator and starter motor testing apparatus according to a preferred embodiment of the present invention.

The invention in some preferred embodiments provides a door interlock apparatus and method for an alternator/starter testing device. In a preferred embodiment, the invention utilizes a micro-switch coupled to a protective door cover to interrupt power to components of an alternator/starter testing device when the protective door cover is in an open position. Preferred embodiments of the invention will now be described with reference to the drawing figures, in which like reference numerals refer to like parts throughout.

FIG. 1 illustrates an alternator and/or starter motor testing device 10 including a housing 12 and a base plate (or chassis) 14 connected thereto. The housing 12 surrounds and supports various operative components of the testing device 10 including for example a power supply, diagnostic electronics, a display, a closable front cover, and the like.

The testing device 10 also includes an alternator belt tensioning arrangement generally designated 16, an alternator mounting arrangement generally designated 18, and a starter holder arrangement generally designated 20. Each of the belt tensioning arrangement 16, the alternator mounting arrangement 18, and the starter motor holder arrangement 20 are mounted directly to the base plate 14. A protective door cover 22 is provided to conceal the belt tensioning arrangement 16, the alternator mounting arrangement 18, the starter motor holder arrangement 20 and test components such as an alternator or starter equipment.

Figure 2:
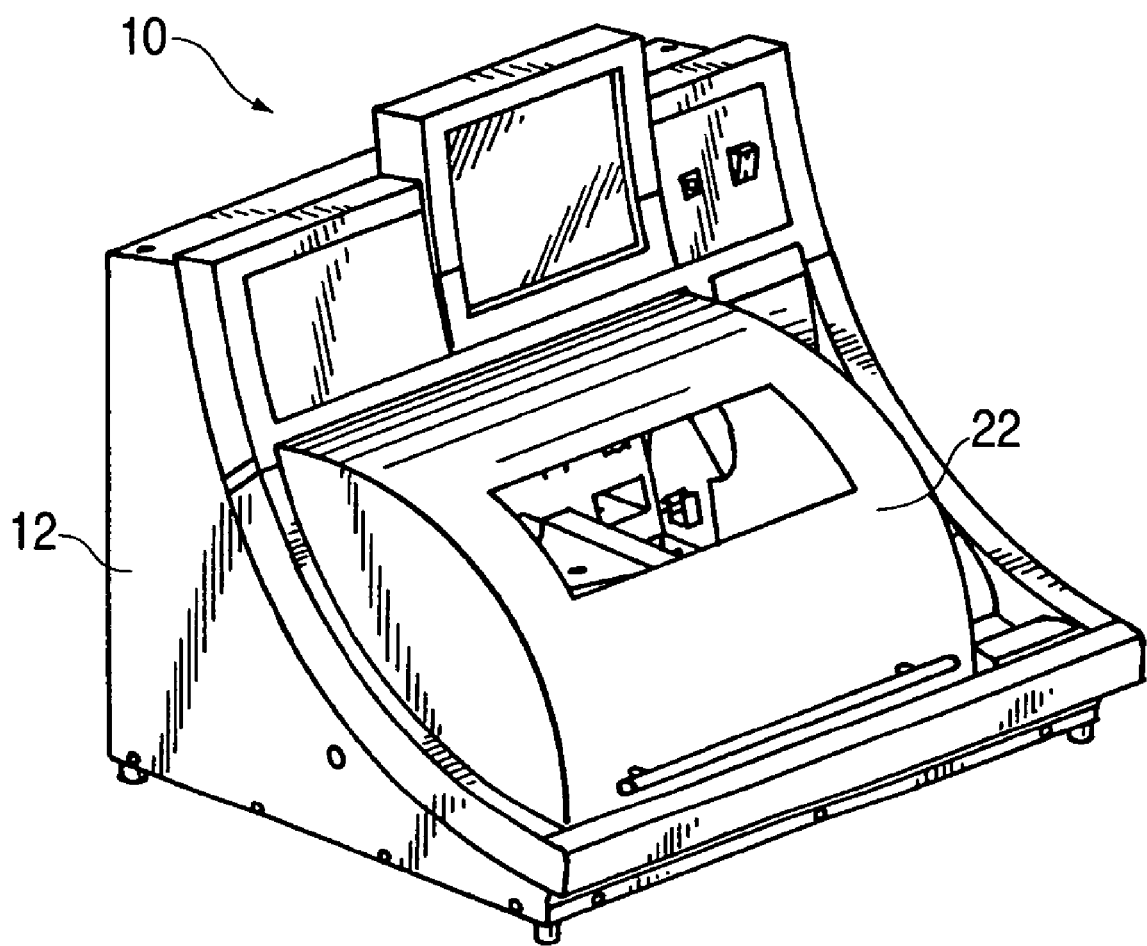
FIG. 2 is a perspective view of the alternator and starter motor testing apparatus of FIG. 1 depicting a protective door cover in a closed position.

Turning to FIG. 2, the protective door cover 22 of the testing device 10 is shown covering at least the belt tensioning arrangement 16, the alternator mounting arrangement 18, and the starter motor holder arrangement 20 in a closed position.

Figure 3:
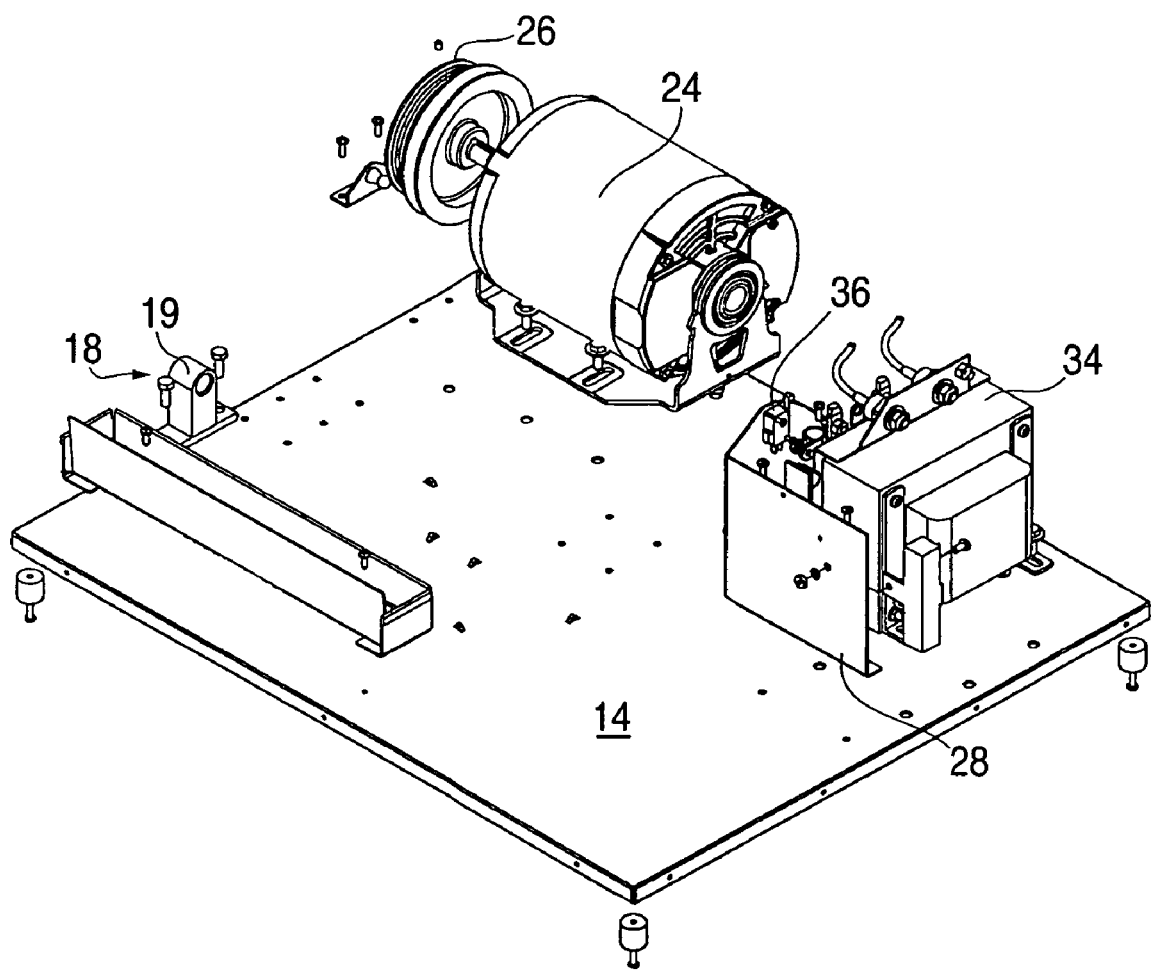
FIG. 3 is a perspective view showing a base plate of the testing apparatus with a motor and alternator mounting components.

Turning to FIG. 3, the base plate 14 is shown having a turret 19 of the alternator mounting arrangement 18. The turret 19 is mounted to the base plate 14 by bolts or other suitable attachment devices. FIG. 3 also illustrates a motor 24 that may be used to drive an alternator belt during alternator testing via a pulley 26. Motor 24 may be directly mounted to the base plate 14 by bolts or other suitable attachment devices. Additionally, a bracket plate 28 is provided to help secure a protective door cover 22 to the testing device 10. Bracket plate 28 may be directly mounted to the base plate 14 by bolts or other suitable attachment devices.

Figure 4:
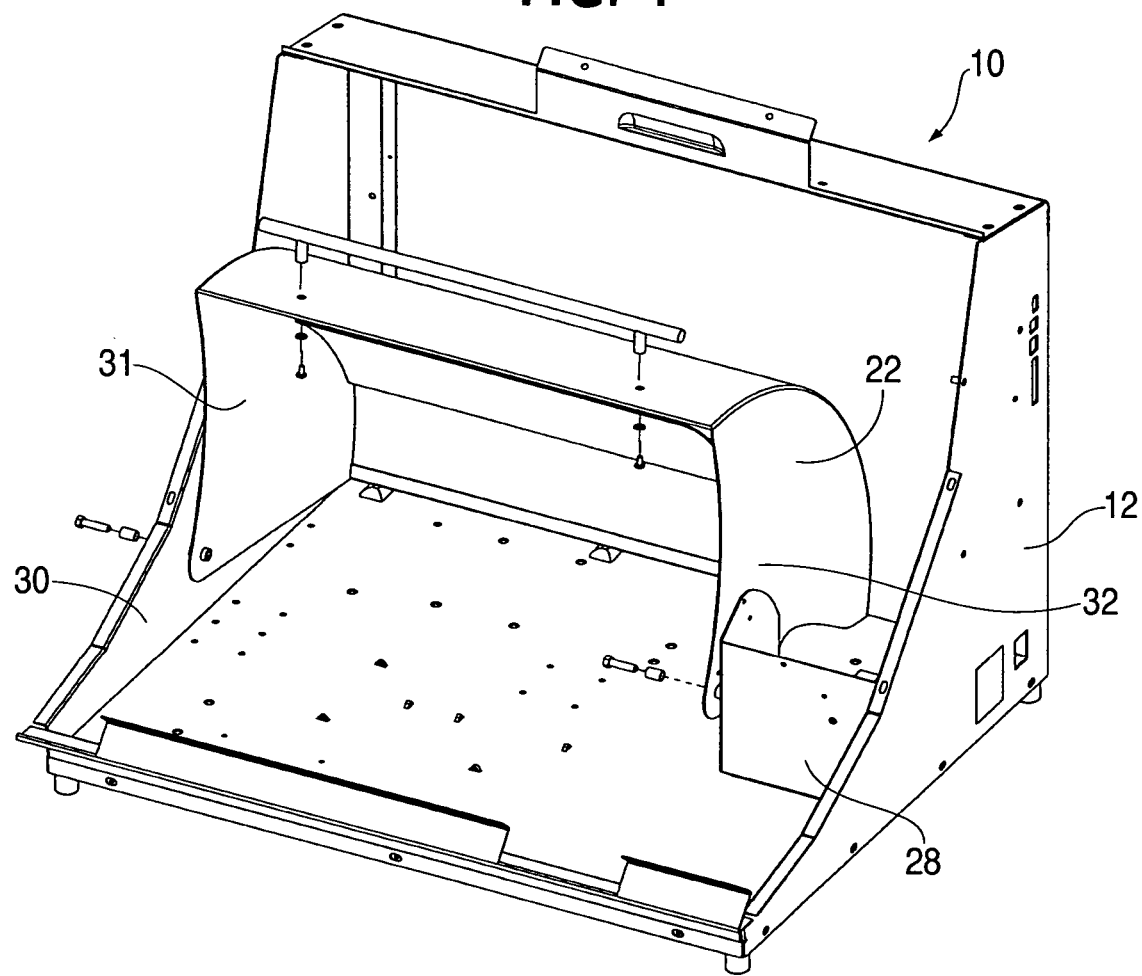
FIG. 4 is a perspective view showing a subassembly arrangement of the safety cover door with respect to the housing of the testing apparatus.

Turning to FIG. 4, the protective door cover 22 is shown in a partially assembled testing device 10. In a preferred embodiment, the protective door cover 22 is designed to fit between a sidewall 30 of the housing 12 and the bracket plate 28. Side walls 31, 32 of the protective door cover 22 may be respectively attached to an inner side wall 30 of the housing 12 and further to a portion of the bracket plate 28. Suitable attachment devices may be utilized to facilitate rotational movement of the protective door cover 22 with respected to the inner side wall 30 and the bracket plate 28. The bracket plate 28 also functions to provide additional protection to components, such as to transformer device 34 located on base plate 14. Additionally, the bracket plate 28 can provide a mounting surface for additional components such as micro-switch 36.

Figure 5:
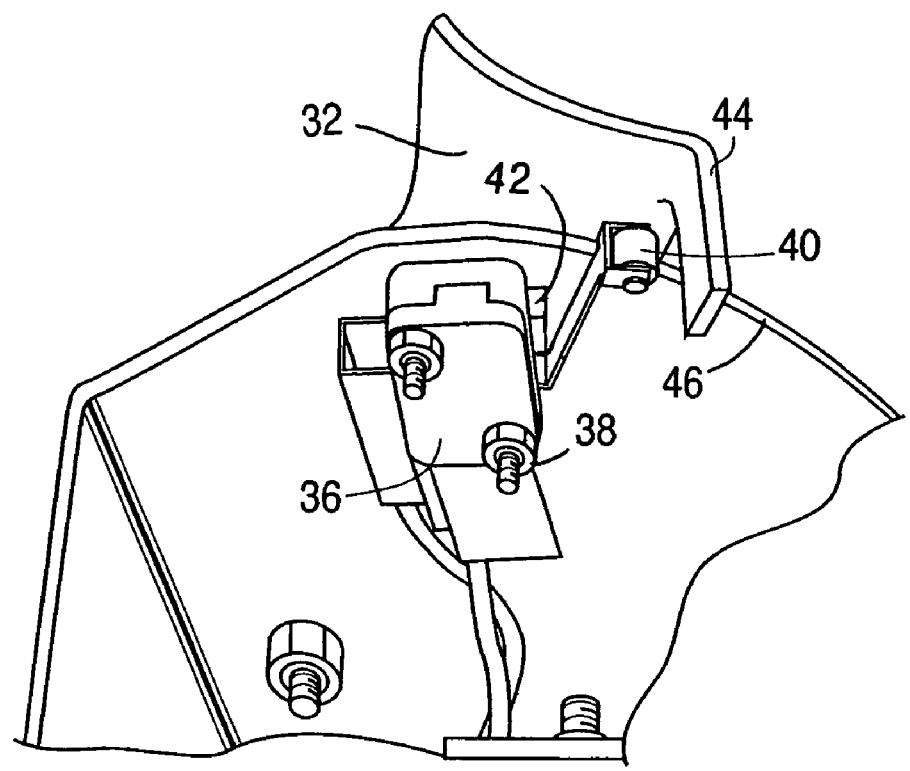
FIG. 5 is an exploded view showing a housing in a first position with respect to a switch assembly.

Turning to FIG. 5, the micro-switch 36 is shown mounted to the bracket plate 28. The micro-switch 36 may be directly mounted to the bracket plate 28 by nut and bolt assembly 38 or other suitable attachment means. Additionally, the micro-switch 36 may be connected to a digital signal processor within the tester device 10 to monitor the state of the micro-switch 36.

The micro-switch 36 preferably comprises a flexible lever device 40 which is designed to contact a trigger button 42. Thus, when a force is enacted against the flexible lever device 40, the flexible lever device 40 is deflected against the trigger button 42 to cause the trigger button 42 to depress. The depressed state of the trigger button 42 completes an electrical circuit within the testing device 10 which allows electrical power to feed components of the testing device 10 including, for example, the motor 24 and transformer device 34.

Figure 6:
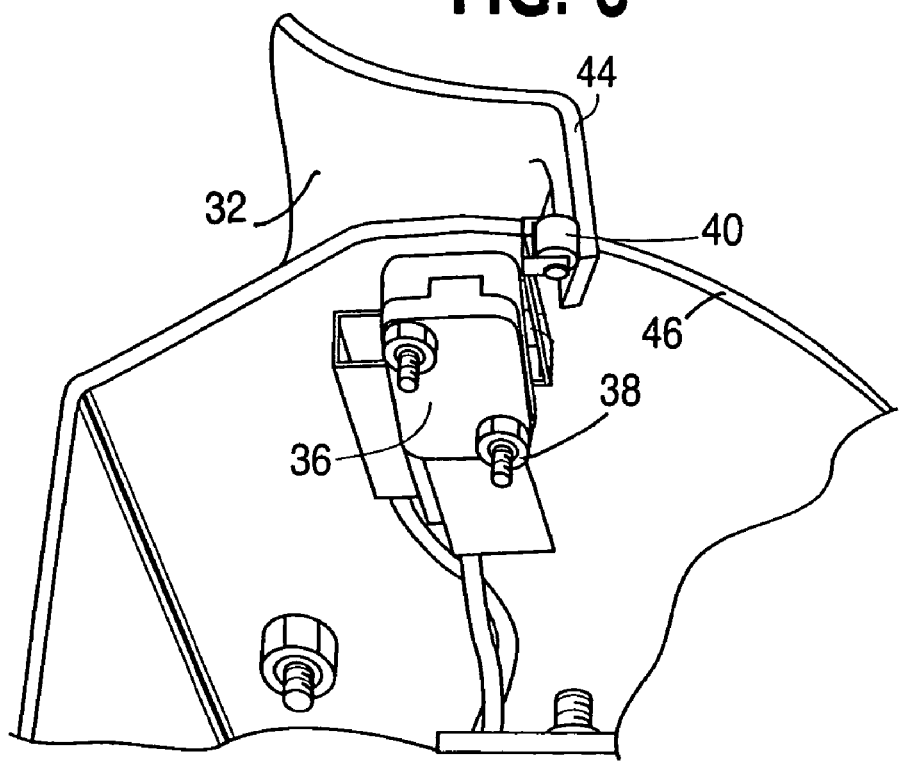
FIG. 6 is an exploded view showing a housing in a second position with respect to a switch assembly.

The protective door cover 22 is preferably designed to contain a tab portion 44 which may be located, for instance, along the side wall 32. In one embodiment, as the protective door cover 22 is rotated to either a closed or open position, the tab portion 44 generally traverses a surface 46 of the bracket plate 28. The micro-switch 36 is preferably mounted such that as the protective door cover 22 is rotated to a closed position, the tab portion 44 contacts the flexible lever device 40 as shown, for instance, in FIG. 6. This creates a closed electrical circuit which allows power to be fed to components of the testing device 10 including, for instance, the motor 24 and transformer device 34.

Thus, in an open position, the tab portion 44 of the protective door cover 22 is rotated away from the flexible lever device 40. Accordingly, the force that is removed from the flexible lever device 40 allows the flexible lever device 40 to deflect away from contacting the trigger button 42. Once the trigger button 42 is deactivated, the electrical circuit which allows power to components of the testing device 10, such as the motor 24 and transformer device 34, is broken. With the electrical circuit open, a design of the present invention will preferably allow power to be supplied to the motor 24 and transformer device 34 of the testing device 10. Additionally, the present invention is preferably designed to interrupt power to the motor 24 and transformer device 34 should the protective door cover 22 be opened during a testing procedure.

Thus, should an operator intentionally or unintentionally open the protective door cover 22 during a testing procedure, a fail-safe design of the present invention is intended to protect against exposure to moving parts, flying debris, and or considerable voltage loads or currents of components. An advantage of the present invention works to effective nullify operation of the testing device 10 by opening the electrical circuit which provides power to the motor 24 and transformer device 34 of the tester device 10. The aforementioned is preferably performed via a digital signal processor which may be coupled to the micro-switch 36 within the tester device 10. A function of the digital signal processor may include acknowledging the state of the micro-switch 36 to determine when power is or should be interrupted accordingly.

A further design of the invention may include programming the digital signal processor to generate an error message and displaying the message to a user when the protective door cover 22 is opened during testing operations or an attempt is made to operate the testing device 10 with the protective door cover 22 in an open position. The aforementioned message may be displayed, for example, on a display screen 48 such as a liquid crystal display.

An additional advantage of the present invention includes presenting and/or creating an inherent difficulty in defeating the relatively hidden location of the micro-switch 36 in a fully assembled testing device 10. Such difficulty may prevent tampering with the fail-safe design characteristics of the micro-switch 36 either intentionally or unintentionally.

Additionally, even for novice operators, the design of the present invention allows less experienced operators to receive an increased measure of safety precaution. Such increased safety measures may be realized simply by interrupting power should the protective door cover 22 be opened during testing or an attempt be made to operate the testing device 10 with the protective door cover 22 in an open position.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed:

1. An apparatus for testing vehicle motor rotary accessory devices, comprising:
    a base;
    a housing having at least one side surface, wherein the housing is connected to the base;
    a first component located and connected to the base;
    a door cover located and rotatably mounted between the at least one side surface and the first component; and
    a switch assembly mounted to the first component and positioned to contact a portion of the door cover when the door cover is rotated to a first position, wherein the switch assembly is not contacted by a portion of the door cover when the door cover is rotated to a second position, wherein the door cover further comprising a tab portion which contacts the switch assembly when the door cover is rotated to the first position and wherein the switch assembly further comprises a micro-switch having a flexible lever device which is designed to contact a trigger button.

2. The apparatus according to claim 1, wherein the tab portion contacts the lever device to deflect the lever device against the trigger button such that the trigger button is depressed when the door cover is rotated in the first position.

3. The apparatus according to claim 2, further comprising powered internal components of the apparatus for testing, wherein power to one or more components is interrupted when the switch assembly is not contact by a portion of the door cover when the door cover is rotated to the second position.

4. The apparatus according to claim 3, wherein the one or more components comprises a motor and a transformer.

5. The apparatus according to claim 1, further comprising a digital signal processor (DSP) coupled to the switch assembly.

6. The apparatus according to claim 5, wherein the DSP controls power to one of more of the components by monitoring a state of the micro-switch.

7. The apparatus according to claim 6, wherein the DSP generates an error message and displays the message to a user when power is interrupted.

8. A method of implementing a safety mechanism in a testing device for vehicle motor rotary accessory devices, comprising:
    providing a base component and a housing component connected to the base component;
    locating and connecting a first component to the base component;
    locating a door cover between a side surface of the housing and the first component;
    rotatably attaching the door cover to the side surface and the first component;
    mounting a switch assembly to the first component; and
    positioning the switch assembly to contact a portion of the door cover when the door cover is rotated to a first position, wherein the door cover further comprises a tab portion which contacts the switch assembly when the door cover is rotated to the first position and wherein the switch assembly further comprises a micro-switch having a flexible lever device which is designed to contact a trigger button.

9. The method according to claim 8, further comprising:
    rotating the door cover to a first position;
    contacting the tap portion of the door cover with the lever device; and
    deflecting the lever device against the trigger button to depress the trigger button.

10. The method according to claim 9, further comprising:
    rotating the door cover to a second position; and
    releasing the tab portion of the door cover from contact with the lever device.

11. The method according to claim 10, further comprising:
    coupling a digital signal processor to the switch assembly; and
    monitoring a state of the switch assembly.

12. The method according to claim 11, further comprising:
    interrupting power to one or more internal components of the testing device when the tab portion of the door cover is released from contact with the lever device.

13. An testing apparatus for testing vehicle motor rotary accessory devices, comprising:
    a base means for supporting the components of the testing apparatus;
    a housing means having at least one side surface, wherein the housing means is connected to the base means;
    a first component means located and connected to the base means;

a cover means located and rotatably mounted between the at least one side surface and the first component means; and a switch assembly means mounted to the first component means and positioned to contact a portion of the cover means when the cover means is rotated to a first position, wherein the switch assembly means is not contacted by a portion of the cover means when the cover means is rotated to a second position, wherein the cover means further comprising a tab portion which contacts the switch assembly means when the cover means is rotated to a first position and wherein the switch assembly means further comprises a microswitch having a flexible lever device which is designed to contact a trigger button.

14. The system of claim 13, wherein the cover means comprises a door cover.

15. The system of claim 13, further comprising powered internal components, wherein power to the internal components is interrupted when the switch assembly means is not in contact with a portion of the cover means.

* * * * *